(12) United States Patent
Sasaki et al.

(10) Patent No.: US 8,564,736 B2
(45) Date of Patent: Oct. 22, 2013

(54) BACKLIGHT UNIT AND LIQUID CRYSTAL MODULE

(75) Inventors: Hisanori Sasaki, Osaka (JP); Shigeru Aruga, Osaka (JP)

(73) Assignee: Panasonic Corporation, Osaka (JP)

( * ) Notice: Subject to any disclaimer, the term of this patent is extended or adjusted under 35 U.S.C. 154(b) by 273 days.

(21) Appl. No.: 13/024,063

(22) Filed: Feb. 9, 2011

(65) Prior Publication Data

US 2011/0285935 A1    Nov. 24, 2011

(30) Foreign Application Priority Data

May 19, 2010    (JP) ................................. 2010-115199

(51) Int. Cl.
*G02F 1/1335*    (2006.01)
*G09F 13/04*    (2006.01)

(52) U.S. Cl.
USPC ........................... 349/61; 362/97.1; 362/97.2

(58) Field of Classification Search
USPC ................... 349/61; 362/97.1, 97.2
See application file for complete search history.

(56) References Cited

U.S. PATENT DOCUMENTS

2006/0171164 A1*  8/2006  Kida ............................. 362/608
2011/0019126 A1*  1/2011  Choi et al. ...................... 349/61

FOREIGN PATENT DOCUMENTS

JP    2009-104946    5/2009

* cited by examiner

*Primary Examiner* — Mark Robinson
*Assistant Examiner* — Jerry Blevins
(74) *Attorney, Agent, or Firm* — Hamre, Schumann, Mueller & Larson P.C.

(57) ABSTRACT

In a backlight unit, a plurality of linear light sources arranged in a first direction are accommodated in a case so that they are covered by the case from a side opposite to an illuminated object. In the case, a reflective sheet is disposed on the bottom surface of the case, and a pair of supporting members are disposed to be spaced from each other in the extending direction of the linear light sources. The supporting members support the diffuser plate and the illuminated object. The diffuser plate has, on the light exit surface thereof, a first light-controlling portion having a pattern of stripes parallel to the linear light sources, and a pair of second light-controlling portions extending in the arrangement direction at positions corresponding to the supporting members.

10 Claims, 8 Drawing Sheets

BACKLIGHT UNIT AND LIQUID CRYSTAL MODULE

BACKGROUND OF THE INVENTION

1. Field of the Invention

The present invention relates to a backlight unit for use in, for example, a liquid crystal display apparatus, and to a liquid crystal module including this backlight unit.

2. Description of Related Art

Conventionally, there has been known a liquid crystal display apparatus including a liquid crystal module mounted in a housing. The liquid crystal module includes a liquid crystal panel and a backlight unit disposed behind the liquid crystal panel. There are two types of backlight units, edge type backlight units and direct type backlight units. For example, JP 2009-104946 A discloses a direct type backlight unit 10 as shown in FIG. 8.

The backlight unit 10 for illuminating a liquid crystal panel 11 from behind includes a plurality of straight tube lamps 12, a case 13 for accommodating the lamps 12 so as to cover the lamps from the side opposite to the liquid crystal panel 11, and a diffuser plate 16 disposed to close the case 13. In the case 13, a reflective sheet 14 is disposed on the bottom surface of the case 13, and a pair of lower supporting members 15 (only one of the pair is shown in FIG. 7) for supporting both ends of the diffuser plate 16 are disposed to overlap both ends of the lamps 12. Furthermore, an upper supporting member 17 for supporting the liquid crystal panel 11 is fixed to the case 13.

The lower supporting member 15 has an inclined inner side surface to reflect light coming from the lamps 12 and the reflective sheet 14 toward the diffuser plate 16. A reflective tape is attached to the inclined surface in some cases, but in the backlight unit disclosed in JP 2009-104946 A, the lower supporting member 15 is formed of a high reflective material. Therefore, the lower supporting member 15 itself reflects the incoming light toward the diffuser plate 16.

In the backlight unit 10 disclosed in JP 2009-104946 A, a wall portion 15a that faces the end face of the diffuser plate 16 is provided on the top surface of the lower supporting member 15, and a reflective sheet 18 is attached to the under surface of the upper supporting member 17. Therefore, light that is guided to a space surrounded by the top surface of the lower supporting member 15, the wall portion 15a, and the reflective sheet 18 by transmission through the diffuser plate 16 is multiply reflected by them, and allowed to reach the peripheral area of the liquid crystal panel 11.

With such a configuration, however, the light reflected by the top surface of the lower supporting member 15, the wall portion 15a, and the reflective sheet 18 is concentrated in the vicinity of the upper supporting member 17 in the peripheral area of the liquid crystal panel 11. As a result, a bright line appears along the edge of the upper supporting member 17 when the liquid crystal panel 11 is seen from the front side thereof.

SUMMARY OF THE INVENTION

The present invention has been made in view of the above circumstances. It is an object of the present invention to provide a backlight unit capable of preventing a bright line from being formed in the peripheral area of an illuminated object, and to provide a liquid crystal module using this backlight unit.

In order to solve this problem, the present invention provides a backlight unit for illuminating an illuminated object from behind. This backlight unit includes: a plurality of linear light sources arranged in a first direction; a case for accommodating the linear light sources so as to cover the linear light sources from a side opposite to the illuminated object; a reflective sheet disposed on a bottom surface of the case facing the linear light sources; a diffuser plate, disposed opposite to the reflective sheet across the linear light sources, for receiving light on a light entrance surface thereof and emitting light from a light exit surface thereof in a diffused manner; and a pair of supporting members disposed to be spaced from each other in an extending direction of the linear light sources in the case. Each of the supporting members has a reflecting portion for reflecting light coming from the linear light sources and the reflective sheet toward the diffuser plate, a first supporting portion for supporting the diffuser plate, and a second supporting portion for supporting the illuminated object. In this backlight unit, the diffuser plate has, on the light exit surface thereof, a first light-controlling portion having a pattern of stripes parallel to the linear light sources, and a pair of second light-controlling portions extending in the first direction at positions corresponding to the supporting members.

With the above configuration, even if a reflective sheet is attached to the first supporting portion side surface of the second supporting portion or the second supporting portion is formed of a high reflective material, the second light-controlling portion can control light that is going to pass through the light exit surface of the diffuser plate toward the illuminated object due to the reflection between the first supporting portion and the second supporting portion. As a result, a bright line is prevented from being formed in the peripheral area of the illuminated object.

DETAILED DESCRIPTION OF THE INVENTION

Hereinafter, embodiments of the present invention will be described with reference to the accompanying drawings.

First Embodiment

Figure 1:
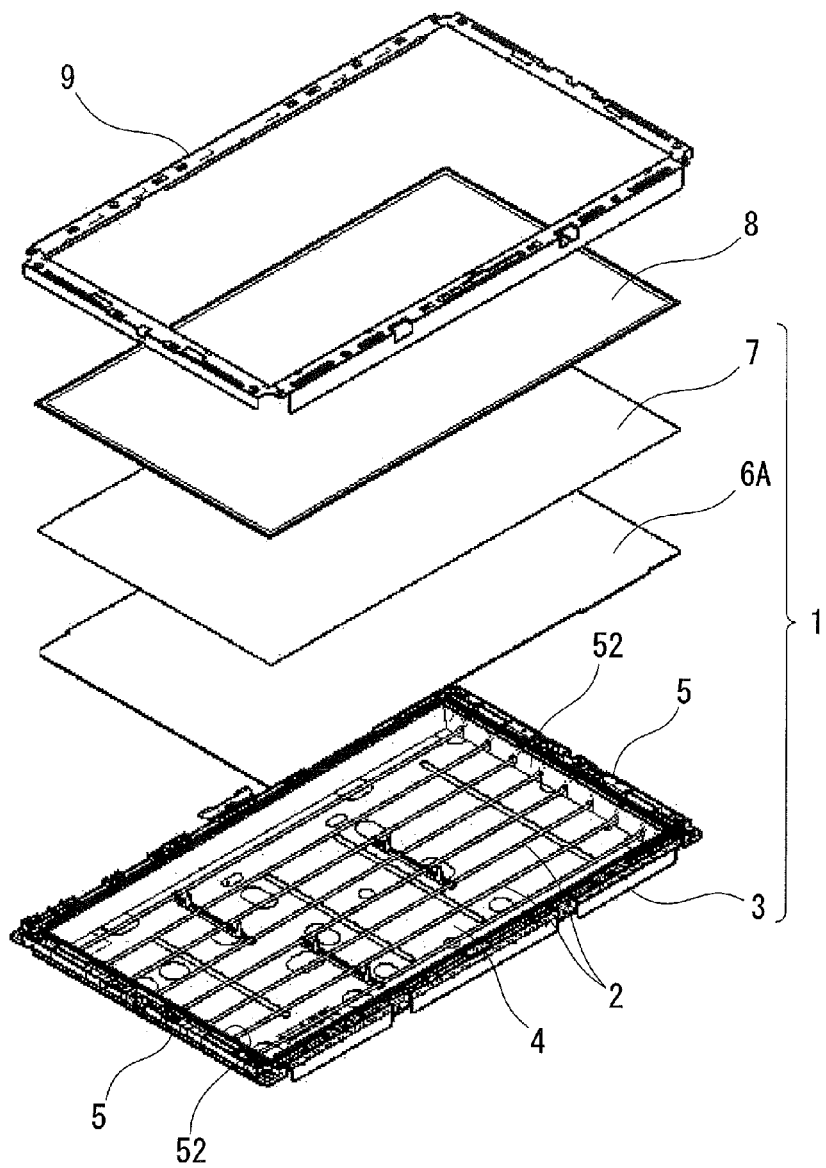
FIG. 1 is an exploded perspective view of a liquid crystal module using a backlight unit according to a first embodiment of the present invention.
Figure 2:
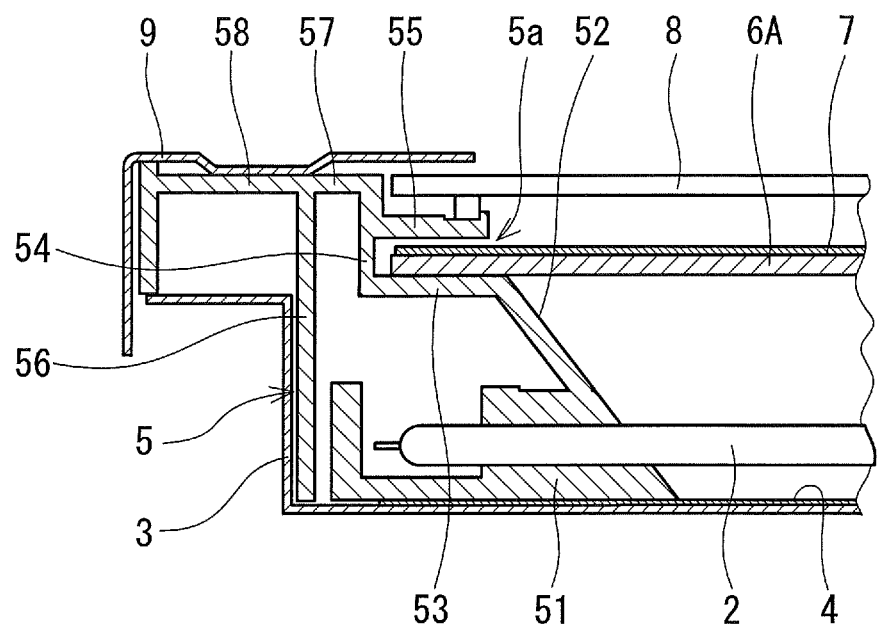
FIG. 2 is a partial cross sectional view of the liquid crystal module of FIG. 1.

FIG. 1 and FIG. 2 show a liquid crystal module using a backlight unit 1 according to a first embodiment of the present invention. This liquid crystal module includes a liquid crystal panel 8 and the backlight unit 1 disposed behind the liquid crystal panel 8. The periphery of the liquid crystal panel 8 is fixed to the backlight unit 1 by a cover frame 9. The liquid crystal module includes a control unit for controlling the liquid crystal panel 8, a driving unit provided with a DC/DC power supply, etc. for supplying power to the backlight unit 1, and others, which are not shown nor described herein because known ones can be used therefor.

The backlight unit 1 illuminates the liquid crystal panel (illuminated object) 8 from behind. For convenience of explanation herein, a direction of light emitted from the backlight unit 1 also is referred to as "upward(ly)", and a direction opposite to that direction also is referred to as "downward(ly)".

Specifically, the backlight unit 1 includes a plurality of linear light sources 2 arranged in a first direction (a direction parallel to the liquid crystal panel 8), a case 3 for accommodating the linear light sources 2 so as to cover the linear light sources 2 from a side opposite to the liquid crystal panel 8 (one of the directions perpendicular to the plane in which the linear light sources 2 are arranged), and a diffuser place 6A disposed to close the case 3. In the case 3, a reflective sheet 4 is disposed on the bottom surface of the case 3 that faces the linear light sources 2, and a pair of supporting members 5 are disposed to be spaced from each other in the extending direction of the linear light sources 2. An optical layer 7, including a prism sheet, for diffusing or condensing light that has passed through the diffuser plate 6A is formed on the diffuser place 6A.

Generally, the backlight unit 1 has a rectangular shape extending in the extending direction of the linear light sources 2 as seen in plan view. The bottom surface of the case 3 and the diffuser plate 6A also have a rectangular shape extending in the extending direction of the linear light sources 2 as the longitudinal direction and in the first direction in which the linear light sources 2 are arranged (hereinafter referred to as a "light source arrangement direction") as the transverse direction.

In the present embodiment, straight tube cold-cathode fluorescent lamps (CCFLs) are used as the linear light sources 2, and they are arranged in parallel to each other. Both end portions of the linear light sources 2 are covered with the supporting member 5. It should be noted that U-shaped cold-cathode fluorescent lamps also may be disposed in the case 3. In this case, the straight line part of each U-shaped lamp corresponds to the "linear light source" of the present invention.

The case 3 is formed of a metal such as aluminum, or a resin. The case 3 is like a box having an opening in one direction, and has a bottom wall constituting the bottom surface parallel to the plane in which the linear light sources 2 are arranged, and a peripheral wall rising from the periphery of this bottom wall. The case 3 of the present embodiment also has a flange portion formed continuously from the upper edge of the peripheral wall.

The reflective sheet 4 covers almost an entire bottom surface of the case 3. The reflective sheet 4 is formed of a metal foil, for example, and reflects, toward the diffuser plate 6A, light that has been emitted from the linear light sources 2 in the direction opposite to the diffuser plate 6A.

Each of the supporting members 5 is formed of a highly reflective material. Such a highly reflective material is, for example, polycarbonate containing titanium oxide. In the present embodiment, each of the supporting members 5 is integrally molded.

As shown in FIG. 2, each of the supporting members 5 has a base portion 51 for holding the end portions of the linear light sources 2, and a reflecting portion 52 extending obliquely upwardly and outwardly from the inner edge of the base portion 51. The inner side surface of the base portion 51 is inclined to form a continuous surface with the inner side surface of the reflecting portion 52. Therefore, light coming from the linear light sources 2 and the reflective sheet 4 to the supporting member 5 is reflected on the inner side surface of the base portion 51 and the inner side surface of the reflecting portion 52 and guided toward the diffuser plate 6A.

Each of the supporting members 5 further includes a first supporting portion 53 for supporting the diffuser plate 6A, a second supporting portion 55 for supporting the liquid crystal panel 8, and a wall portion 54, facing the end face of the diffuser plate 6A, for joining the first supporting portion 53 and the second supporting portion 55 integrally. The first supporting member 53 extends in parallel to the bottom surface of the case 3 outwardly from the upper edge of the reflecting portion 52, and the wall portion 54 rises vertically from the outer edge of the first supporting portion 53. The second supporting portion 55 overhangs in parallel to the first supporting portion 53 from the upper edge of the wall portion 54. The first supporting portion 53, the second supporting portion 55, and the wall portion 54 form a groove-like recess 5a that opens inwardly. The longitudinal end portion of the diffuser plate 6A is inserted into this recess 5a.

Each of the supporting members 5 further includes an approximately L-shape bent portion 57 extending upwardly from the outer edge of the second supporting portion 55 and then extending outwardly, a side wall portion 56 extending downwardly along the peripheral wall of the case 3 from the outer edge of the bent portion 57, and a fixing portion 58, formed continuously from the outer edge of the bent portion 57, for fixing the cover frame 9.

The diffuser plate 6A is disposed opposite to the reflective sheet 4 across the linear light sources 2, and has a light entrance surface for allowing direct light from the linear light sources 2 and reflected light from the reflective sheet 4 to enter the diffuser plate 6A, and a light exit surface for allowing the light diffused in the diffuser plate 6A to exit therefrom. The above-mentioned optical layer 7 is formed on the light exit surface.

Figure 3:
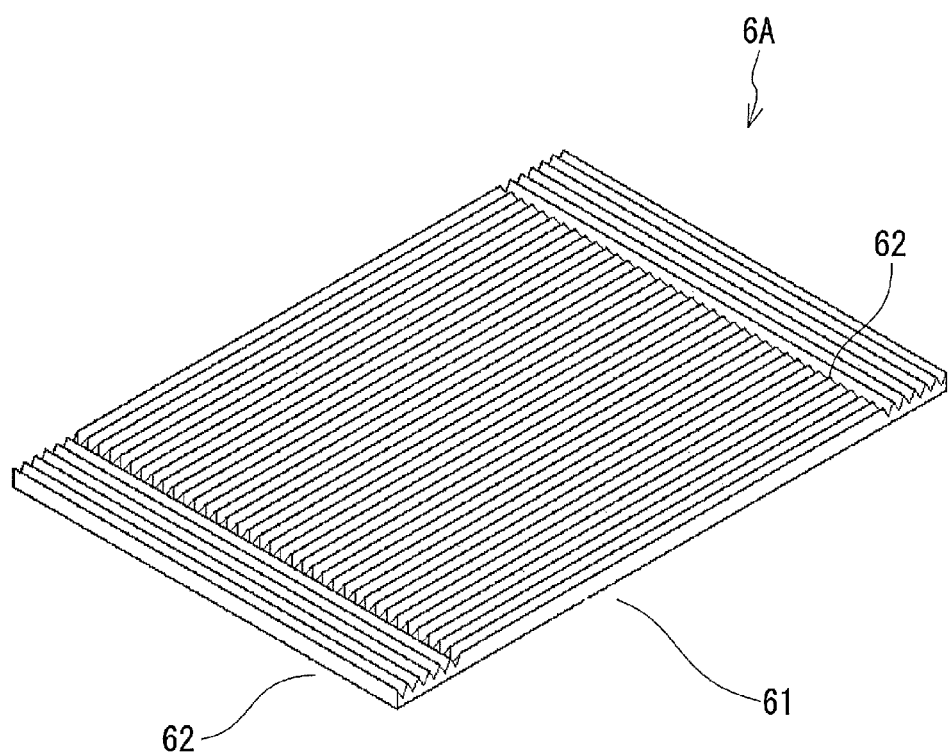
FIG. 3 is a perspective view of a diffuser plate used in the backlight unit according to the first embodiment of the present invention.

As shown in FIG. 3, in the longitudinal direction of the diffuser plate 6A, a first light-controlling portion 61 is formed in the mid-portion of the light exit surface of the diffuser plate 6A, and a pair of second light-controlling portions 62 are formed at both end portions of the light exit surface of the diffuser plate 6A. The first light-controlling portion 61 has a pattern of stripes parallel to the linear light sources 2, and the second light-controlling portions 62 extend in the light source arrangement direction at positions that correspond to the supporting members 5 respectively. In the present embodiment, the first light-controlling portion 61 and the second light-controlling portions 62 each are configured with a plurality of prismatic elements (protrusions each having a triangular cross section) that define the refraction directions of light that passes through the light exit surface.

The first light-controlling portion 61 is configured to adjust the direct light from the linear light sources 2 and the reflected light from the reflective sheet 4 in the light source arrangement direction so as to obtain uniformly distributed light. Specifically, the prismatic elements are arranged with a relatively small pitch in the areas directly above the linear light sources 2. In other areas between the directly above areas, the prismatic elements are arranged with a gradually increasing pitch as the distance from the linear light sources 2 increases.

Figure 4:
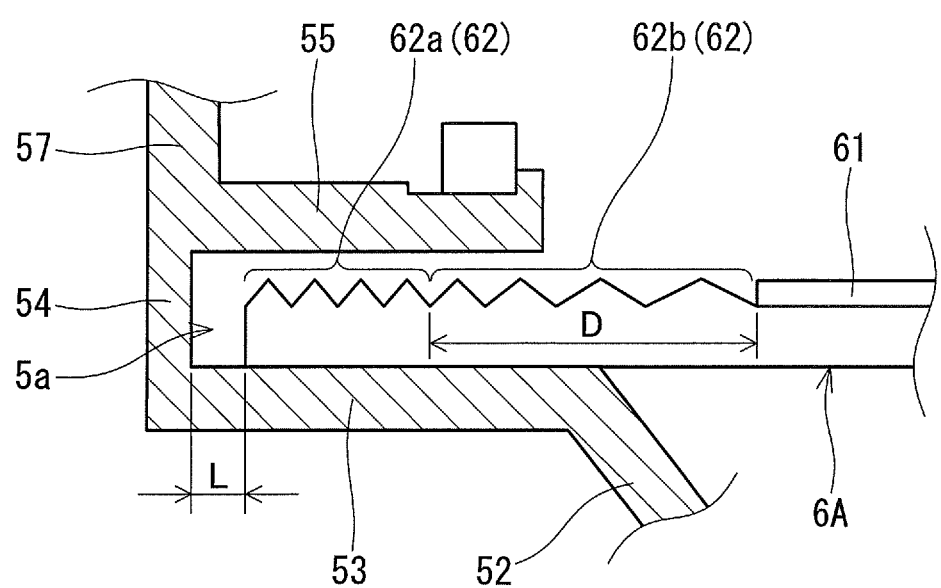
FIG. 4 is a schematic cross sectional view for explaining the structure of a second light-controlling portion of the diffuser plate of FIG. 3.

Each of the second light-controlling portions 62 controls, in the extending direction of the linear light sources 2, light that is allowed to reach the light exit surface from the first supporting portion 53 by reflection in the recess 5a of the supporting member 5, so that the luminance in the vicinity of the second supporting portions 55 becomes equal to that in the mid-portion corresponding to the first light-controlling portion 61 in the backlight unit 1. Specifically, as shown in FIG. 4, each of the second light-controlling portion 62 includes a constant part 62a adjacent to the wall portion 54 and a varying part 62b extending over the edge of the second supporting portion 55, in other words, extending on both sides of the edge of the second supporting portion 55. The constant part 62a has the prismatic elements with a relatively small pitch, and the varying part 62b has the prismatic elements with a gradually increasing pitch from the constant part 62a toward the first light-controlling portion 61. The optical layer 7 is not shown in FIG. 4.

Since a diffuser plate used in a conventional backlight unit usually is extrusion-molded, only the first light-controlling portion is formed on the light exit surface. If such a simple diffuser plate is used instead of the diffuser plate 6A of the present embodiment, light that has been multiply reflected in the recess 5a of the supporting member 5 is finally reflected by the first supporting portion 53, and illuminated to the liquid crystal panel 8 through the vicinity of the edge of the second supporting portion 55. As a result, a bright line appears along the edge of the second supporting portion 55 when the liquid crystal panel 8 is seen from the front side thereof.

In contrast, in the backlight unit 1 of the present embodiment using the diffuser plate 6A having the second light-controlling portions 62 at positions corresponding to the supporting members 5, the varying parts 62b of the second light-controlling portions 62 distribute light, which travels through the vicinity of the edge of the second supporting portions 55 if a simple diffuser plate is used, in the direction away from the edge of the second supporting portions 55. As a result, a bright line is prevented from being formed in the peripheral area of the liquid crystal panel 8.

Preferably, the varying part 62b has a width D greater than a distance L between the wall portion 54 and the end face of the diffuser plate 6A. If the varying part 62b has such a width, the edge of the second supporting portion 55 is always located above the varying part 62b even if the diffuser plate 6A expands or contracts due to a temperature change or the position of the diffuser plate 6A with respect to the supporting member 5 shifts. As a result, the reliability of the light control by the varying part 62b can be improved.

Second Embodiment

Next, a backlight unit according to a second embodiment of the present invention will be described. Since the backlight unit of the present embodiment is the same as the backlight unit 1 of the first embodiment except that a diffuser plate 6B shown in FIG. 5 is used instead of the diffuser plate 6A, only the diffuser plate 6B is described below.

Figure 5:
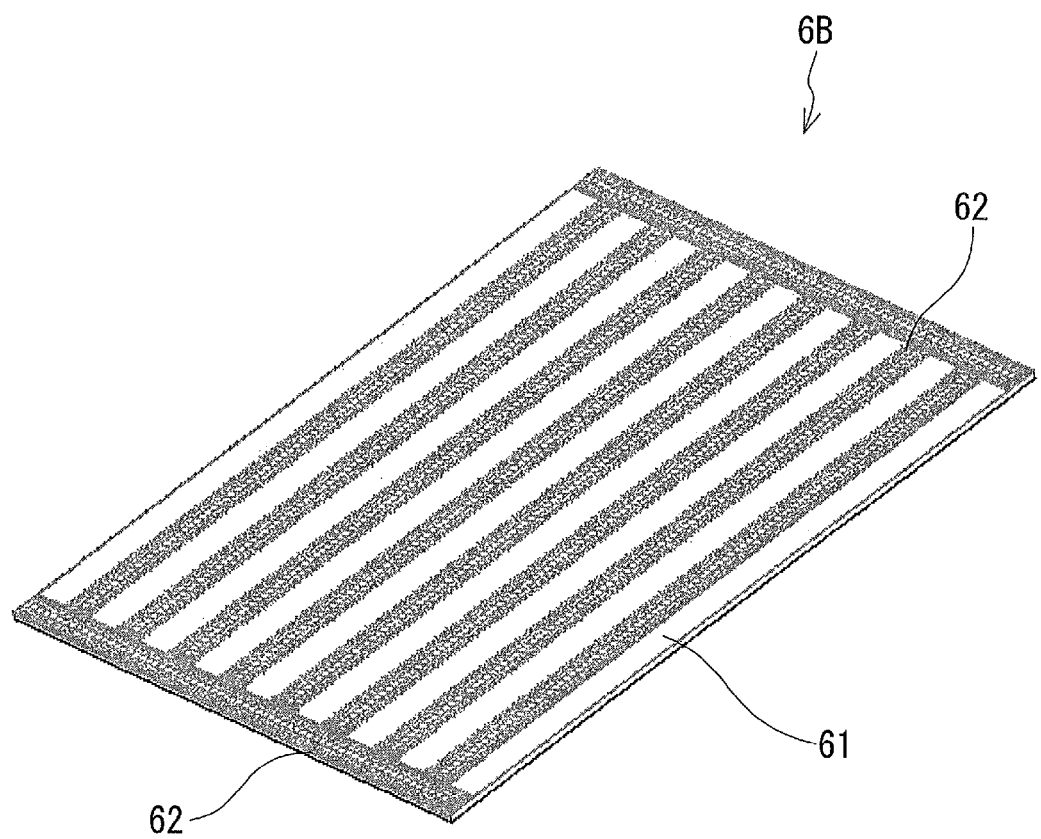
FIG. 5 is a perspective view of a diffuser plate used in a backlight unit according to a second embodiment of the present invention.

In the diffuser plate 6B shown in FIG. 5, the first light-controlling portion 61 formed in the mid-portion of the light exit surface, the pair of second light-controlling portions 62 formed on both end portions of the light exit surface each are configured with a pattern of dots that defines the transmittance of light through the light exit surface. This dot pattern can be formed by printing with an ink jet printer, for example.

The first light-controlling portion 61 is configured to adjust direct light from the linear light sources 2 and reflected light from the reflective sheet 4 in the light source arrangement direction so as to obtain uniformly distributed light. Specifically, the dots are arranged with a relatively high density in the areas directly above the linear light sources 2. In other areas between the directly above areas, the dots are arranged with a gradually decreasing density as the distance from the linear light sources 2 increases.

Figure 6:
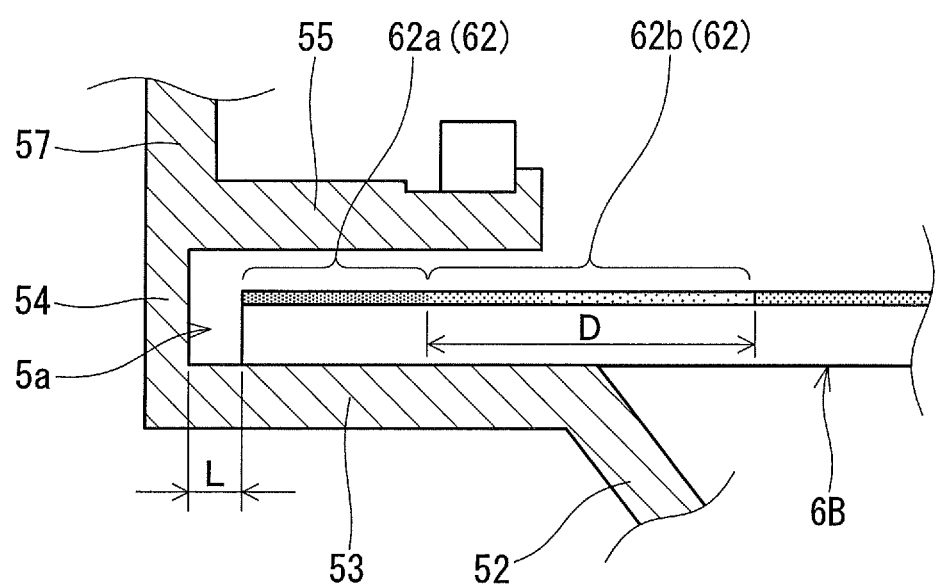
FIG. 6 is a schematic cross sectional view for explaining the structure of a second light-controlling portion of the diffuser plate of FIG. 5.

Each of the second light-controlling portions 62 controls, in the extending direction of the linear light sources 2, light that is allowed to reach the light exit surface from the first supporting portion 53 by reflection in the recess 5a of the supporting member 5, so that the luminance in the vicinity of the second supporting portions 55 becomes equal to that in the mid-portion corresponding to the first light-controlling portion 61 in the backlight unit 1. Specifically, each of the second light-controlling portions 62 has a constant part 62a adjacent to the wall portion 54 and a varying part 62b extending over the edge of the second supporting portion 55, in other words, extending on both sides of the edge of the second supporting portion 55, se shown in FIG. 6. The constant part 62a has the dots with a relatively high density, and the varying part 62b has the dots with a gradually decreasing density from the constant part 62a to the first light-controlling portion 61. The optical layer 7 is not shown in FIG. 6.

In the backlight unit of the present embodiment, the varying part 62b of the second light-controlling portion 62 gradually restricts the light traveling in the vicinity of the edge of the second supporting portion 55 as it comes closer to the edge of the second supporting portion 55. As a result, a bright line is prevented from being formed in the peripheral area of the liquid crystal panel 8.

Preferably, the varying part 62b has a width D greater than a distance L between the wall portion 54 and the end face of the diffuser plate 6A, for the same reason as in the first embodiment.

Other Embodiments

In the first and second embodiments, the second light-controlling portion 62 has the constant part 62a outside the varying part 62b, but the constant part 62a may be omitted depending on the length of the diffuser plate 6A and the depth of the recess 5a of the supporting member 5. From the manufacturing viewpoint, the constant part 62a preferably is formed as the reference pitch of prismatic elements or the reference density of dots.

Furthermore, the supporting member 5 may be separated into two parts, a part including the first supporting portion 53 and a part including the second supporting portion 55, at the upper or lower edge of the wall portion 54, for example. However, if the first supporting portion 53 and the second supporting portion 55 are integrally joined by the wall portion 54, the component cost and the assembly cost can be reduced.

Figure 7:
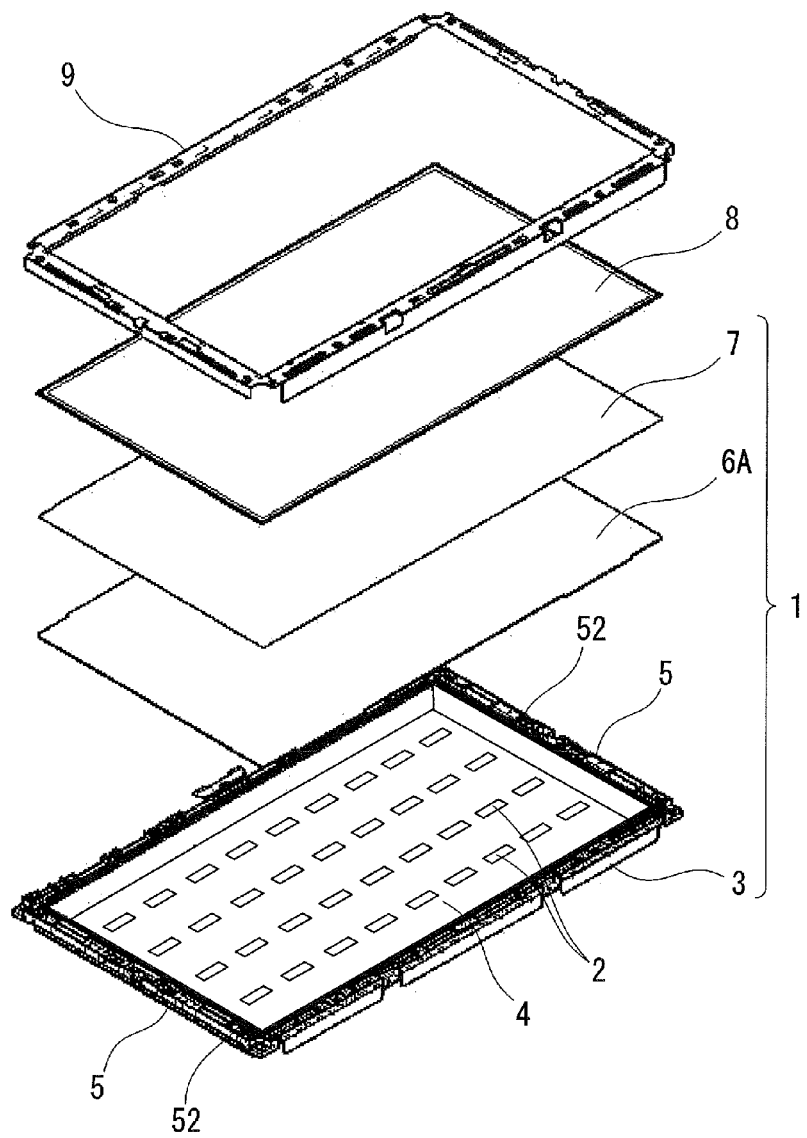
FIG. 7 is an exploded perspective view of a liquid crystal module using a modified backlight unit.
Figure 8:
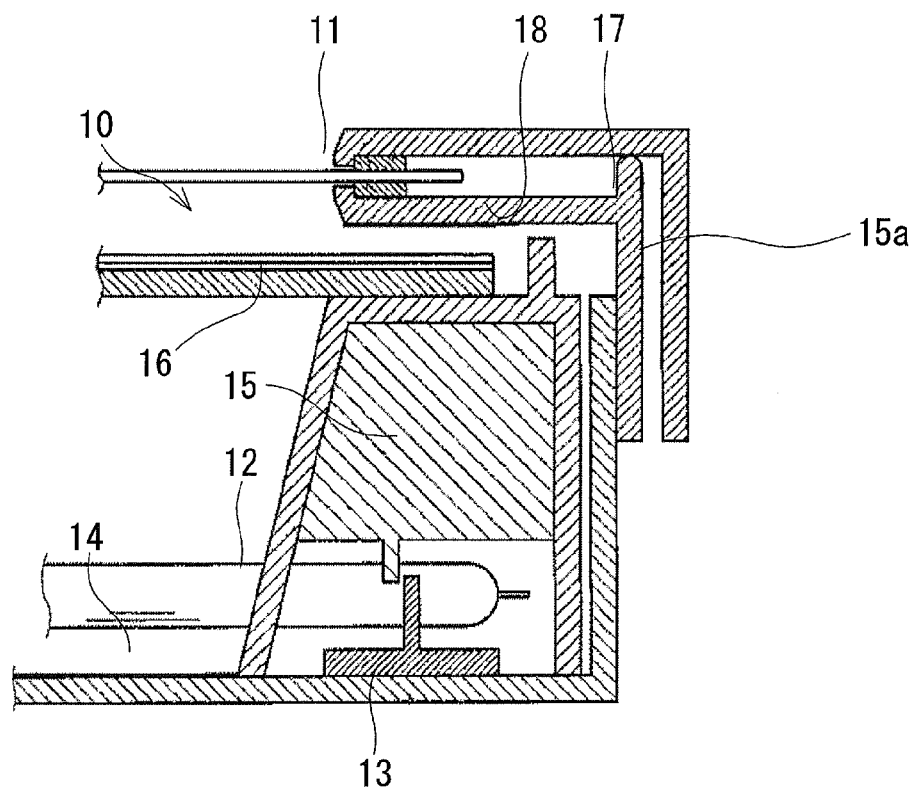
FIG. 8 is a partial cross sectional view of a conventional backlight unit.

In the first and second embodiments, each of the linear light sources 2 is formed of a single cold-cathode fluorescent lamp, but each linear light source 2 may be formed of linearly-arranged LEDs, as shown in FIG. 7. Even when the linear light sources 2 formed of such LEDs are provided, a bright line is prevented from being formed in the peripheral area of the liquid crystal panel 8, as in the first and second embodiments.

The present invention allows a backlight unit with uniform luminance to be obtained, and can be applied to backlight units used for various purposes.

The invention may be embodied in other forms without departing from the spirit or essential characteristics thereof. The embodiments disclosed in this specification are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A backlight unit for illuminating an illuminated object from behind, comprising:
   a plurality of linear light sources arranged in a first direction;
   a case for accommodating the linear light sources so as to cover the linear light sources from a side opposite to the illuminated object;
   a reflective sheet disposed on a bottom surface of the case facing the linear light sources;
   a diffuser plate, disposed opposite to the reflective sheet across the linear light sources, for receiving light on a light entrance surface thereof and emitting light from a light exit surface thereof in a diffused manner; and
   a pair of supporting members disposed to be spaced from each other in an extending direction of the linear light sources in the case, each of the supporting members having a reflecting portion for reflecting light coming from the linear light sources and the reflective sheet toward the diffuser plate, a first supporting portion for supporting the diffuser plate, and a second supporting portion for supporting the illuminated object,
   wherein the diffuser plate has, on the light exit surface thereof, a first light-controlling portion being configured to adjust light from the linear light sources and reflected light from the reflective sheet so as to obtain light uniformly distributed in the first direction, and a pair of second light-controlling portions extending in the first direction at positions corresponding to the supporting members and controlling the light emitted from the diffuser plate in the extending direction of the linear light sources.

2. The backlight unit according to claim 1, wherein each of the supporting members further has a wall portion that faces an end face of the diffuser plate, and the first supporting portion and the second supporting portion are integrally joined by the wall portion.

3. The backlight unit according to claim 2, wherein the first light-controlling portion is configured to adjust direct light from the linear light sources and reflected light from the reflective sheet in the first direction so as to obtain uniformly distributed light, and
   each of the second light-controlling portions controls, in the extending direction of the linear light sources, light that is allowed to reach the light exit surface from the first supporting portion by reflection in a recess formed by the first supporting portion, the second supporting portion, and the wall portion.

4. The backlight unit according to claim 3, wherein the first light-controlling portion and the second light-controlling portion are each configured with a plurality of prismatic elements.

5. The backlight unit according to claim 4, wherein each of the second light-controlling portions has a constant part adjacent to the wall portion and a varying part extending over an edge of the second supporting portion, the constant part having the prismatic elements with a relatively small pitch, and the varying part having the prismatic elements with a gradually increasing pitch from the constant part toward the first light-controlling portion.

6. The backlight unit according to claim 5, wherein the varying part has a width greater than a distance between the wall portion and the end face of the diffuser plate.

7. The backlight unit according to claim 3, wherein the first light-controlling portion and the second light-controlling portion are each configured with a pattern of dots.

8. The backlight unit according to claim 7, wherein each of the second light-controlling portions has a constant part adjacent to the wall portion and a varying part extending over an edge of the second supporting portion, the constant part having the dots with a relatively high density, and the varying part having the dots with a gradually decreasing density from the constant part toward the first light-controlling portion.

9. The backlight unit according to claim 8, wherein the varying part has a width greater than a distance between the wall portion and the end face of the diffuser plate.

10. A liquid crystal module comprising:
    the backlight unit according to claim 1; and
    a liquid crystal panel that is the illuminated object illuminated by the backlight unit.

* * * * *